United States Patent
Sprague et al.

(10) Patent No.: US 10,460,845 B2
(45) Date of Patent: Oct. 29, 2019

(54) NUCLEAR REACTOR FLOW PATH SEALING SYSTEMS AND SEALS

(71) Applicant: GE-Hitachi Nuclear Energy Americas LLC, Wilmington, NC (US)

(72) Inventors: Robin D Sprague, Wilmington, NC (US); Zachary W Kosslow, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 525 days.

(21) Appl. No.: 14/942,540

(22) Filed: Nov. 16, 2015

(65) Prior Publication Data

US 2017/0140843 A1    May 18, 2017

(51) Int. Cl.
*G21C 13/028* (2006.01)
*F16J 15/08* (2006.01)
*G21C 13/02* (2006.01)
*G21C 21/00* (2006.01)

(52) U.S. Cl.
CPC ........ *G21C 13/028* (2013.01); *F16J 15/0887* (2013.01); *F16J 15/0893* (2013.01); *G21C 13/02* (2013.01); *G21C 21/00* (2013.01); *Y02E 30/40* (2013.01)

(58) Field of Classification Search
CPC ... G21C 13/028; F16J 15/0893; F16J 15/0887
See application file for complete search history.

(56) References Cited

U.S. PATENT DOCUMENTS

| | | | |
|---|---|---|---|
| 4,200,061 | A | 4/1980 | Sterk et al. |
| 4,345,549 | A | 8/1982 | Colmano |
| 4,904,442 | A | 2/1990 | Swidwa et al. |

(Continued)

FOREIGN PATENT DOCUMENTS

| | | | |
|---|---|---|---|
| DE | 19728715 A1 * | 12/1998 | ........... F16J 15/0893 |
| DE | 19728715 A1 | 12/1998 | |

(Continued)

OTHER PUBLICATIONS

A European Search Report and Opinion issued in connection with corresponding EP Application No. 16198473.7 dated Mar. 15, 2017.

*Primary Examiner* — Lily C Garner
(74) *Attorney, Agent, or Firm* — Ryan Alley IP

(57) ABSTRACT

Seals are positioned between abutting nuclear reactor components. Example seals are held in position by gravity, grooves, retainers, direct joining, or other mating structures to seal the abutting components. Compression of example seals drives the seals against the joining components, preventing fluid passage therebetween. Example seals may include a cavity opening to a higher pressure fluid outside the joined components to drive expansion or sealing of the seal. Seals may have a C-shaped, E-shaped, O-ring, coiled, helical, or other cross-section to provide such a cavity. Example seals may be flexible materials compatible with radiation and heat encountered in a nuclear reactor. Seals may be continuous or sectional about the abutment of the components. An annular seal may extend continuously around a perimeter of removably joined core plates, supports, shrouds, and/or chimney heads and structures. Seals can be installed between and in the components at any time access is available to the components.

18 Claims, 4 Drawing Sheets

(56) References Cited

U.S. PATENT DOCUMENTS

| | | | |
|---|---|---|---|
| 5,309,626 A | | 5/1994 | Tolino |
| 5,828,713 A | * | 10/1998 | Schmidt .................. G21C 5/10 376/260 |
| 6,504,888 B1 | * | 1/2003 | Fife ...................... G21C 15/243 277/318 |
| 7,813,464 B1 | | 10/2010 | Harkness |
| 8,475,139 B2 | | 7/2013 | Sprague et al. |
| 8,608,010 B2 | * | 12/2013 | Constantin ............... F16J 13/00 220/233 |
| 8,807,573 B2 | * | 8/2014 | Ohmi .................. F16J 15/0881 277/643 |
| 2007/0201607 A1 | * | 8/2007 | Watanabe .............. G21C 1/084 376/371 |
| 2012/0057992 A1 | * | 3/2012 | Sprague ................... F04F 5/44 417/54 |
| 2013/0228980 A1 | * | 9/2013 | Swensen ............. F16J 15/0893 277/634 |
| 2017/0011812 A1 | | 1/2017 | Sprague et al. |

FOREIGN PATENT DOCUMENTS

| | | | | |
|---|---|---|---|---|
| EP | 2426671 | A2 | 3/2012 | |
| WO | WO-9828560 | A1 * | 7/1998 | ........... F16J 15/3208 |

\* cited by examiner

NUCLEAR REACTOR FLOW PATH SEALING SYSTEMS AND SEALS

BACKGROUND

FIG. 1 is cross-sectional schematic view of a related art reactor pressure vessel 100, such as an ESBWR pressure vessel. Vessel 100 includes a core plate 118 laterally supporting one or more fuel assemblies 110 within core shroud 114. Fluid coolant and/or moderator, such as liquid water, is typically delivered into an annular downcomer region 101 about a perimeter of vessel 100 by a feedwater line, chimney runoff, or other coolant supply source. The fluid flows downward through downcomer 101 a core inlet region below core plate 118. At the core inlet, the fluid turns and flows up into the core, bounded by core shroud 114 and containing assemblies 110. At the bottom of core shroud 114, the fluid is redirected and flows upward through assemblies 110 in a central core of vessel 100. As such, core shroud 114 separates upward flow of coolant through the core and assemblies 110 therein from downcomer flow in an annulus 101.

Core plate 118 supports core shroud 114 and may itself be supported by support ring and legs 102. Core plate 118, core shroud 114, and/or support ring 102 may all be cylindrical or annular to extend about a complete inner perimeter or angular length of vessel 100. Top guide 112 may be positioned at the top of the core shroud 114 to provide lateral support and positioning to the top of fuel assemblies 110. As liquid coolant boils among assemblies 110, a heated mixture of steam and water flows upward through top guide 112. Chimney 120, with flow-directing partitions 121, receives the energetic steam/water mixture exiting fuel assemblies 110. Steam separator assembly 140 may be positioned at an upper end of chimney 120, such as at chimney head 122.

Any of core shroud 114, core plate 118, top guide 112, and chimney 120 may be movable with respect to one another and removably joined during operation. Chimney head 122 may be laterally supported by chimney restraint 123, which may be paired, slip-fitting brackets on chimney 120 and an inner wall of vessel 100. Atop chimney 120, steam separator assembly 140 may receive the directed energetic fluid flow and separate liquid water from the steam-water mixture rising therethrough. Steam from the steam separator assembly 140 flows upward to steam dryer 141, where additional moisture is removed. The separated and removed liquid is directed back down into downcomer annulus 101, and the dried steam exiting steam dryer 141 is then directed into main steam lines 103 for electrical power production.

SUMMARY

Example embodiments include one or more seals for use between abutting components in a nuclear reactor environment. Example seals can be installed between components where they are joined or touch, such as in a groove within or other area between the components. Example seals in the groove are compressed by the abutment and thus seal against the components in the direction of the components' joining. The components may divide distinct flow paths inside a nuclear reactor, for example, and example seals can take advantage of different properties of the flow paths to further enhance the seal. For example, seal may include an expandable concavity that opens toward the flow with higher pressure and is closed against other flows. The higher pressure may expand or drive the concavity and thus seal further in the direction of the components' joining, enhancing the seal. This can better isolate flows with different characteristics across the components and prevent unwanted mixing and deterioration of differences between flows. For example, elastic seals with a C-shaped or E-shaped cross-section in a plane parallel to the fluid flows may take advantage of such pressure differences. Seals may also have O-ring, coiled, and/or helical cross-sections, as additional examples.

Example seals can be any shape or size to enhance sealing between distinct components. For example, seals may form a continuous path about a perimeter of the abutting structures in a plane perpendicular to the flow paths. Seals may be ring-shaped, annular, or any other shape in this manner about an axis of the components' joining. Example seals may be held between the abutting components by gravity, a groove in the components, a retaining clip, welding, etc. For example, in the instance the components to be sealed are core supports or plates, shrouds, and/or chimney structures isolating a downcomer flow from a core flow, seals may be held between the components by retainers attached to the same bolts removably joining these structures in the reactor.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
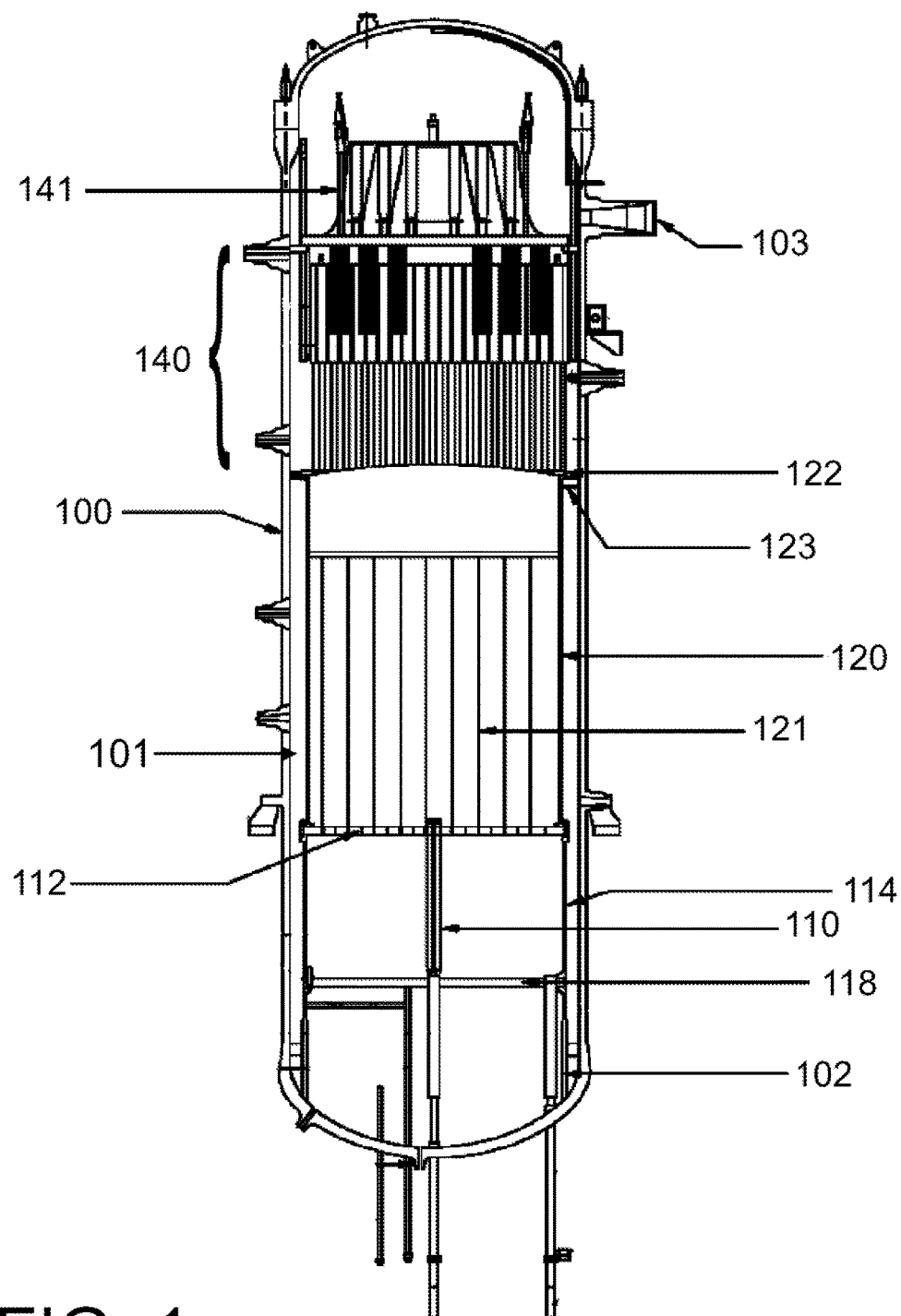
FIG. 1 is an illustration of a related art nuclear power vessel and internals.

Because this is a patent document, general broad rules of construction should be applied when reading and understanding it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

The inventors have recognized that structures forming a downcomer region, such as a core plate, core shroud, shroud support, chimney, etc., may be removably joined through mating structures that do not completely seal the downcomer region from internal core flow. Fluid in the downcomer is typically a lower-temperature liquid under forced-flow pressure, while flow up through the core is higher-temperature, potentially two-phase flow. The inventors have newly recognized the potential for leakage between these two flows, such as where a core plate and shroud or shroud support sit on one another as separate pieces through which highly energetic flows may escape. The inventors have further recognized that leakage between downcomer and core flow in newer, natural-circulation reactor designs, such as an ESBWR, may be particularly detrimental in assuring a strong natural circulation drive in the instance of reliance on natural circulation, such as in a loss of offsite power transient. For example, cooler downcomer flow leaking into hotter core flows may cool or condense fluid flowing up through the core, decreasing the natural pressure gradient between these flows and reducing natural circulation cooling. As such, the Inventors have newly recognized a need for resilient sealing between structures separating flows at different pressures as well as sealing between structures separating a lower-energy downcomer flow from a higher-energy core flow, especially in natural circulation reactors where natural circulation is a key element of primary coolant loop flow. Example embodiments described below address these and other problems recognized by the Inventors with unique solutions enabled by example embodiments.

The present invention is seals for use in a nuclear reactor environment and systems including the same. In contrast to the present invention, the small number of example embodiments and example methods discussed below illustrate just a subset of the variety of different configurations that can be used as and/or in connection with the present invention.

Figure 2:
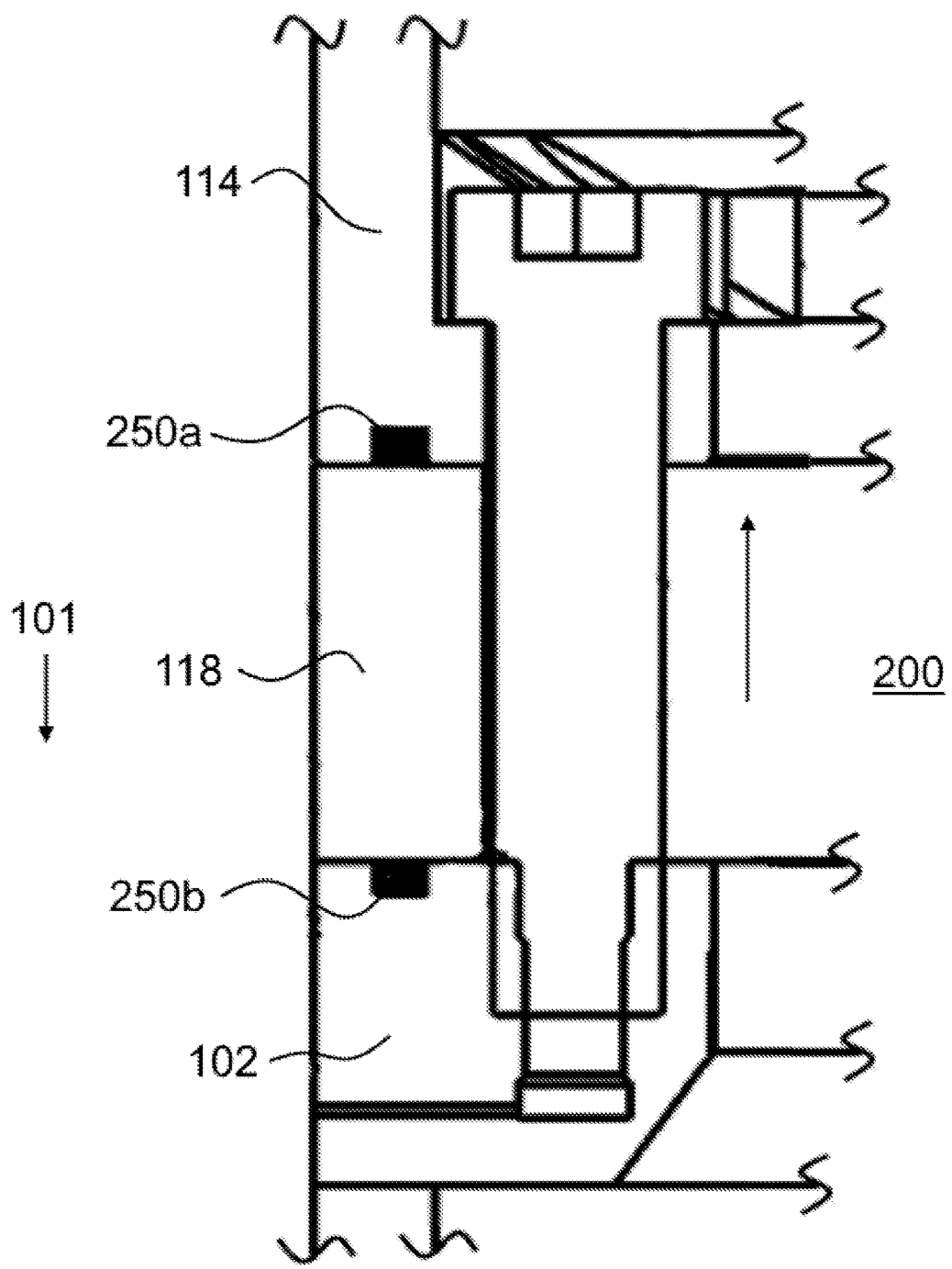
FIG. 2 is a schematic cross-section of an example embodiment sealing system.

FIG. 2 is a cross-sectional detail about core plate 118 adjacent to downcomer region 101 of vessel 100 from FIG. 1. As shown in FIG. 2, example embodiment seal system 200 is useable inside a nuclear reactor, with several components in the same. Example embodiment seal system 200 includes one or more elastic seals 250 between separate reactor internal components subject to leakage. For example, seals 250a and 250b may be installed between components that divide fluid flows within the reactor, such as components that separate a downcomer region 101 from internal core flows. These components may be a shroud support 102, core plate 118, and/or core shroud 114, as shown in FIG. 2. Of course, seals 250 are also useable in and between other flow-dividing structures, such as between core barrels, top guides, chimney sections, chimney heads, steam separators, reactor heads, etc., as well as any other reactor structures that would benefit from resistive sealing, such as modified reactor internals and/or coolant loop components.

In FIG. 2, downward flow ↓ is to the left, or outward radially, in downcomer 101, while upward flow ↑ is inside a core area to the right, or inward radially. Downward flow ↓ may be annular, about an angular perimeter of the reactor, while FIG. 2 is only a cross-sectional schematic showing radial and axial dimensions. Downward flow ↓ in downcomer 101 may be relatively cooler liquid water at a relatively higher pressure from natural circulation, while upward flow ↑ may be hotter steam-and-water mixture flowing under relatively lower pressure. For example, in an ESBWR downward flow ↓ may be condensed liquid at about 270 degrees Celsius and above about 7.2 MPa whereas upward flow ↑ may be at over 280 degrees Celsius, below 7.2 MPa, and contain dual-phase flow.

Seals 250 are present in example embodiment system 200 between structures dividing the upward and downward flows in order to prevent fluid leakage, and thus energy transfer, between the flows. Seals 250 may be a continuous annular ring, so as to continuously seal a perimeter of the structures shown in FIG. 2 when taken in three dimensions, or any other shape to provide desired sealing. For example, for a generally flat cylindrical core plate 118 and annular core shroud 114, seal 250a may be a continuous annulus seating between shroud 114 and core plate 118 to reduce flow through a juncture of shroud 114 and core plate 118. Shroud 114 may be removably bolted, or even resting only under gravitational forces, on core plate 118, such that movement and/or uneven contact between shroud 114 and core plate 118 is possible under extreme forces encountered in nuclear hydraulics. Seals 250 reduce or prevent leakage in this instance.

Figure 3:
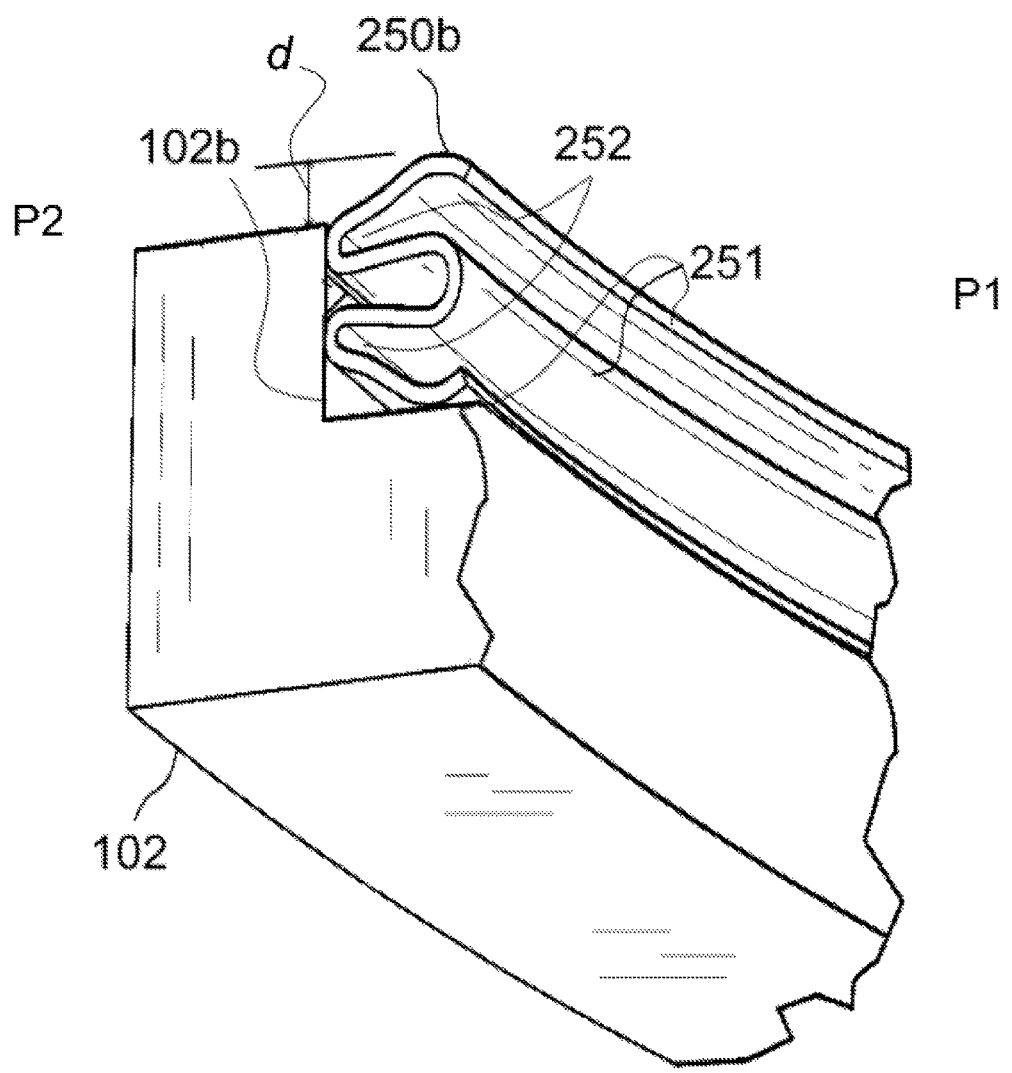
FIG. 3 is an illustration of an example seal useable in example embodiment systems.

Seals 250 may take on a variety of forms to seal contacts between flow-creating structures in a nuclear reactor environment such as in example system 200. FIG. 3 illustrates a first example seal, usable as seal 250b in FIG. 2. As shown in FIG. 3, example seal 250b may be an E-shaped seal with an alternating or labyrinthine shape. A similar seal is described in co-owned application Ser. No. 12/876,567, filed Sep. 7, 2010, now U.S. Pat. No. 8,475,139, which is incorporated by reference herein in its entirety, and whose seals and methods may be similar to example seal 250b if reengineered in accordance with this detailed description. Example seal 250b is sized to fit in a groove 102b machined or otherwise created in a contact surface of the structure to be sealed, such as an upper face of shroud support 102 that would contact a core plate 118 (FIG. 2). Groove 102b is shown in partial cut-away in FIG. 3, and it is understood that groove 102b may be a ledge or completely contained width-wise in a structure such as shroud support 102. Groove 102b and seal 250b may extend an entire circumference of shroud support 102 so as to entirely seal an interior of support 102 from an exterior of the same.

Groove 102b may be formed during fabrication or installation of core support 102, such as by molding, machining, stamping, etc., and seal 250b may be placed in groove 102b shortly thereafter. Similarly, groove 102b may be formed during a maintenance period or outage when a reactor core is disassembled and contact surfaces are available for modification to create groove 102b. Seal 250b can also be placed in groove 102b during such maintenance periods, either in newly-formed or existing groove 102b, potentially replacing an existing or worn-out seal. Seal 250b may fit relatively closely in groove 102b and remain in the same via gravity and/or installation of another structure above groove 102b. Similarly, seal 250b may be welded, bolted, or otherwise attached to a surface in groove 102b.

Example seal 250b is sized to protrude vertically a distance d from groove 102b and is elastically compressible in the vertical direction along d. For example, groove 102b may be only 1-2 inches deep vertically in core support 102, and seal 250b may extend less than a quarter of an inch above groove 102b in distance d. Seal 250b is configured to compress the distance d and exert spring resistive force due to such compression, forming a seal. Seal 250b may be sized of a thickness and chosen of a nuclear-reactor-environment-compatible material that will not fail or plastically deform when compressed distance d, such as a stainless steel or other metallic alloys like X-750 or Alloy 718 (modified). Alternatively, seal 250b may plastically or permanently deform when compressed distance d, while still forming a seal against a compressing structure.

As shown in FIG. 3, example seal 250b may be E-shaped to further take advantage of a pressure differential across sealed structures. For example, P1 may be of a higher pressure than P2 on opposite sides of a shroud support 102, and any leaking fluid may have a tendency to thus flow from P1 across an upper face of shroud support 102 to P2. Expandable gaps 252 in example seal 250b may take advantage of this pressure differential and drive seal 250b to expand vertically in direction d under such pressure differential. Particularly, by shaping and positioning gaps 252 to open toward higher pressure P1, with tines 251 and gaps 252 radially seating in groove 102b, seal 250b may be driven to vertically expand by pressure P1 expanding gaps 252 more than pressure P2. Such vertical force in seal 250b created by a pressure differential may enhance vertical force and thus seal effectiveness between seal 250b and a structure seated on and compressing the same, such as core plate 118 (FIG. 2). Similarly, if P2 is expected to be greater than P1, such as fluid in downcomer 101 (FIG. 2) being expected to have a higher pressure than core fluid flow, example seal 250b may be reversed to better take advantage of the opposite pressure differential.

Figure 4A:
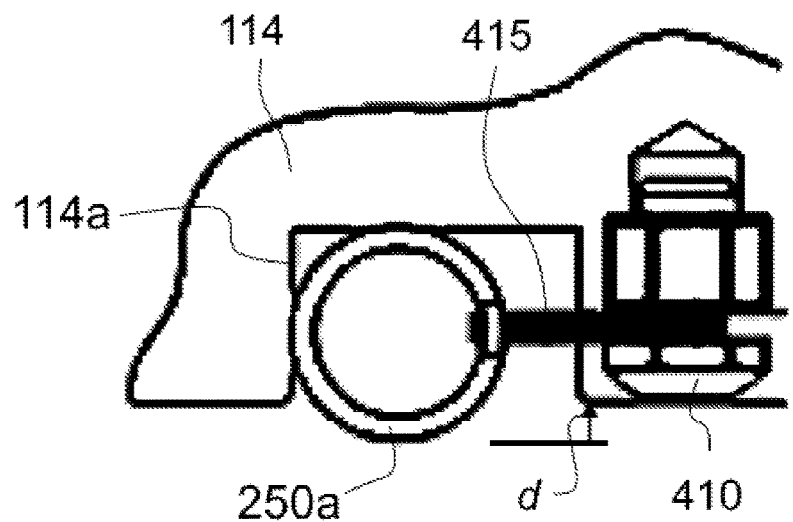
FIGS. 4A and 4B are schematic cross-sections of additional example seals useable in example embodiment systems.
Figure 4B:
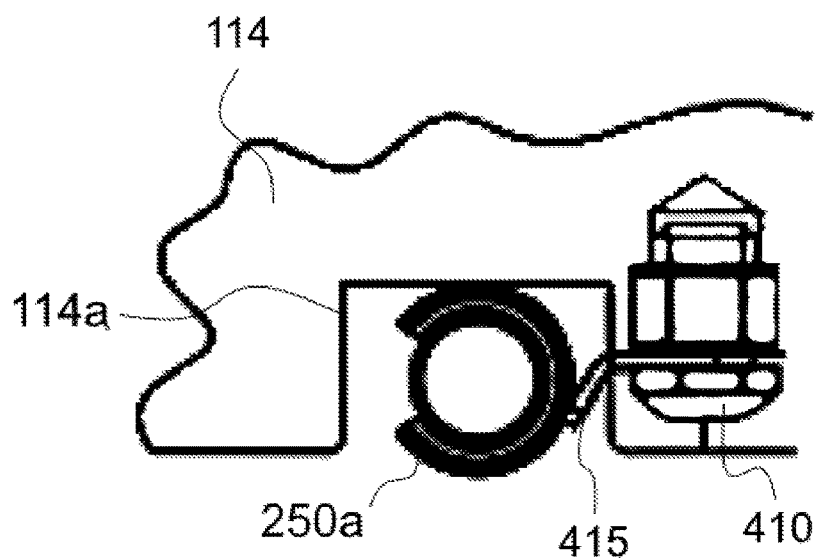

FIGS. 4A and 4B are additional examples of seals useable in example system 200 of FIG. 2. For example, as shown in FIGS. 4A and 4B, example seal 250a may be a C-shaped ring, with in single (FIG. 4A) or double with an inner O-ring (FIG. 4B). A groove 114a may house example seal 250a in an upper face of a flow-directing structure, such as shroud 114. Similar to groove 102b (FIG. 3), groove 114a may be created in any manner to house seal 250a. Similar to FIG. 2, FIGS. 4A and 4B are cross-sectional schematics, and seals 250a extend in non-illustrated depth directions, potentially to form an annular ring or section with a C-shaped cross-section.

Example seal 250a may be sized to fit in groove 114a, with a small vertical protrusion to allow for compression and sealing across distance d when shroud 114 is vertically seated against a lower structure, such as core plate 118 in example system 200 (FIG. 2). Because groove 114a may be in a downward-facing vertical orientation and example spring 250a may be installed in groove 114a against the force of gravity, retaining clip 415 may be used to hold example spring in groove 114a when not compressed. For example, retaining clip 415 may adjoin in a gap of a C-shaped example seal 250a (FIG. 4A) or may join to or push-against a curvature of a C-shaped example seal 250a (FIG. 4B), through frictional contact, welding, bolting, or other joining and retaining mechanisms. Bolt 410 may secure retaining clip 415 to the upper structure, such as shroud 114. Bolt 410 may further be used to removably join the overall abutting structures, such as shroud 114 and core plate 118.

Similarly, example seals 250a may be used in chimney sections and steam separating and drying equipment described in co-owed application Ser. No. 14/792,512 to "CHIMNEY AND LOADING/UNLOADING METHODS FOR THE SAME IN NUCLEAR REACTORS" filed Jul. 6, 2015 and incorporated herein in its entirety. In such an adaptation, structures 114 or 102 (FIG. 3) may be chimney barrels or extensions, for example. Bolts 410 may be external bolts or seismic pins that removably join the chimney components. Seals 250 may seal an entire perimeter of chimney portions that compress seals 250 when vertically joined, preventing intermixing of opposite flows on either side of the chimney.

Example seals 250a in FIGS. 4A and 4B may be shaped to take advantage of a pressure differential between divided flows similarly to other example seals. As shown in FIGS. 4A and 4B, example seals 250a may be C-shaped, such that increased pressure on the side of the opening of the C forces vertical expansion of seals 250a, enhancing vertical force and seal between abutting structures. Seal 250a of FIG. 4A may be a single ring seal, while seal 250a of FIG. 4B includes an additional double internal ring to increase seal spring constant and effectiveness. Example seals 250a are formed of flexible, elastic sealing materials compatible with an operating nuclear reactor environment, such as a metal alloy. Of course, E-shaped and other seals may also be used in groove 250a in example systems to take advantage of pressure differentials.

Example embodiments and methods thus being described, it will be appreciated by one skilled in the art that example embodiments may be varied and substituted through routine experimentation while still falling within the scope of the following claims. For example, a variety of different reactor structures that join together to direct flow configurations are compatible with example embodiment systems and seals simply through proper dimensioning of example embodiments—and fall within the scope of the claims. Such variations are not to be regarded as departure from the scope of these claims.

What is claimed is:

1. A seal system for use in a nuclear reactor environment, the system comprising:
 a first component;
 a second component abutting the first component, wherein the second component includes a groove in a surface abutting the first component;

a seal in the groove configured to seal against the first component in a first direction, wherein the seal includes an opening into a concavity in the seal configured to drive the seal in the first direction under relative higher pressure at the opening, wherein the groove opens only in the first direction, and wherein the first component has a continuously flat surface that directly abuts the surface of the second component and the seal in the groove so as to completely close the groove; and wherein the first and second component, when abutted, separate a downcomer having a first fluid flow from a reactor core having a second fluid flow, and wherein the first and the second fluid flows are either parallel or antiparallel to the first direction.

2. The seal system of claim 1, wherein the opening faces a second direction perpendicular to the first direction.

3. The seal system of claim 1, wherein the seal has at least one of an E-shaped and C-shaped cross-section.

4. The system of claim 1, wherein the seal is annular around an external axis in the first direction so as to extend continuously about an entire perimeter where the second component abuts the first component.

5. The system of claim 1, wherein the seal is metallic and elastic, and wherein the uncompressed seal has a height in the first direction extending out of the groove, and wherein when compressed to a height of the groove, the seal experiences elastic, and not plastic, deformation.

6. The system of claim 1, further comprising:
a retainer holding the seal in the groove.

7. The system of claim 1, wherein the second component is a core shroud, and wherein the opening faces the first fluid flow.

8. A seal system for use in a nuclear reactor environment, the system comprising:
a first flow divider inside a nuclear reactor;
a second flow divider inside the nuclear reactor vertically above and directly joined to the first flow divider, wherein the first and second flow dividers together separate an annular downcomer containing a first coolant flow from a core area containing a second coolant flow in the nuclear reactor;
a seal internally compressed between the first and second flow dividers so as to not be directly exposed to the first coolant flow or the second coolant flow; and
wherein the first flow divider and the second flow divider are parts of a chimney system inside the nuclear reactor.

9. The seal system of claim 8, wherein the first flow is liquid feedwater flowing downward, and wherein the second flow is upward core flow.

10. The seal system of claim 8, wherein the first flow divider and the second flow divider directly join about a ring, and wherein the seal is an annulus compressed in the ring.

11. The seal system of claim 8, wherein the seal has at least one of a C-shaped and an E-shaped cross-section.

12. The seal system of claim 11, wherein the seal has an E-shaped cross-section with two openings facing the first flow, and wherein the first flow has a higher pressure than the second flow.

13. The seal system of claim 12, wherein the seal is annular and a flexible metallic alloy.

14. The seal system of claim 13, wherein the uncompressed seal has a height extending out of the at least one of the first and the second flow dividers, and wherein when compressed to a height of the groove, the seal experiences elastic, and not plastic, deformation.

15. The seal system of claim 8, further comprising:
a bolt removably joining the first flow divider and the second flow divider; and
a retainer holding the seal internal to the at least one of the first and the second flow dividers, wherein the retainer is joined to the bolt.

16. The seal system of claim 8, wherein at only one of the first and the second flow dividers includes a groove that opens only toward the other of the at least one of the first and the second flow dividers.

17. The seal system of claim 16, wherein the groove is in a surface at which the first and the second flow dividers directly abut, and wherein the seal is compressed to a height of the groove by the first and the second flow dividers directly abutting.

18. The seal system of claim 1, further comprising:
a bolt removably joining the first component and the second component; and
a retainer holding the seal in the groove, wherein the retainer is joined to the bolt.

* * * * *